(12) United States Patent
Herrin et al.

(10) Patent No.: US 10,819,855 B2
(45) Date of Patent: *Oct. 27, 2020

(54) MANAGING, MONITORING AND TRANSCRIBING CONCURRENT MEETINGS AND/OR CONFERENCE CALLS

(71) Applicant: INTERNATIONAL BUSINESS MACHINES CORPORATION, Armonk, NY (US)

(72) Inventors: Bradley C. Herrin, Marina del Rey, CA (US); Morris S. Johnson, Jr., Cary, NC (US); Jarett Stein, Bryn Mawr, PA (US); Xianjun Zhu, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,110

(22) Filed: May 8, 2019

(65) Prior Publication Data

US 2019/0327362 A1 Oct. 24, 2019

Related U.S. Application Data

(63) Continuation of application No. 15/399,352, filed on Jan. 5, 2017, now Pat. No. 10,334,110.

(51) Int. Cl.
*H04M 1/64* (2006.01)
*H04M 3/56* (2006.01)
(Continued)

(52) U.S. Cl.
CPC ........ *H04M 3/568* (2013.01); *G06Q 10/1095* (2013.01); *G10L 15/26* (2013.01);
(Continued)

(58) Field of Classification Search
CPC ............... H04M 3/568; H04M 7/0039; H04M 3/42221; H04M 3/565; H04M 2201/40;
(Continued)

(56) References Cited

U.S. PATENT DOCUMENTS 8,265,931 B2 9/2012 Caldwell
8,798,596 B2* 8/2014 Shuster ................. H04W 4/023
455/414.1

(Continued)

FOREIGN PATENT DOCUMENTS

WO 2007051128 A3 12/2008
WO 2015030718 A1 3/2015
WO 2015133989 A1 9/2015

OTHER PUBLICATIONS

Andrei Iancu; "Remarks by Director Iancu at the Intellectual Property Owners Association 46th Annual Meeting"; Sep. 24, 2018, Chicago, Illinois; retrieved on Nov. 21, 2018 from the Internet: <https://www.uspto.gov/about-us/news-updates/remarks-director-iancu-intellectual-property-owners-46th-annual-meeting>; 7 pages.
(Continued)

*Primary Examiner* — Solomon G Bezuayehu
(74) *Attorney, Agent, or Firm* — Schmeiser, Olsen & Watts; Michael P. O'Keefe

(57) ABSTRACT

A system, a method and a computer program product for managing multiple meetings and/or conference calls by performing the steps of receiving, by a computer, invitations to attend, by at least one attendee, two or more meetings, and detecting, by the computer, a one or more conflicts between the two meetings. The computer communicates, to the attendee, at least one detected conflict of the one or more detected conflicts. The computer receives an identification of a single meeting of the two or more meetings the at least one attendee will attend and at least one meeting to be transcribed. At least one meeting to be transcribed includes
(Continued)

all meetings of the two or more meetings exclusive of the single meeting the attendee will attend. At least a portion of the at least one meeting is transcribed into a first textual transcript and selectively delivered to the attendee in real time.

20 Claims, 8 Drawing Sheets

(51) Int. Cl.
    *G06Q 10/10*     (2012.01)
    *H04M 3/42*     (2006.01)
    *G10L 15/26*     (2006.01)
    *H04M 7/00*     (2006.01)

(52) U.S. Cl.
    CPC ....... *H04M 3/42221* (2013.01); *H04M 3/565* (2013.01); *H04M 7/0039* (2013.01); *H04M 3/42348* (2013.01); *H04M 2201/40* (2013.01)

(58) Field of Classification Search
    CPC . H04M 3/42348; G10L 15/26; G06Q 10/1095
    See application file for complete search history.

(56) References Cited

U.S. PATENT DOCUMENTS

| | | | |
|---|---|---|---|
| 8,891,752 B2 | 11/2014 | Jackson | |
| 9,251,476 B2* | 2/2016 | Keohane | G06Q 10/00 |
| 2005/0034079 A1* | 2/2005 | Gunasekar | G06Q 10/10 |
| | | | 715/753 |
| 2007/0211876 A1* | 9/2007 | Othmer | H04M 1/656 |
| | | | 379/201.01 |
| 2010/0041447 A1* | 2/2010 | Graylin | G10L 15/26 |
| | | | 455/575.2 |
| 2010/0246792 A1 | 9/2010 | Acosta | |
| 2011/0281569 A1* | 11/2011 | Cohen | H04L 51/38 |
| | | | 455/416 |
| 2012/0243670 A1* | 9/2012 | Horesh | H04L 51/02 |
| | | | 379/88.16 |
| 2015/0249747 A1* | 9/2015 | Boss | H04M 3/565 |
| | | | 379/85 |
| 2016/0165373 A1 | 6/2016 | Menke | |
| 2017/0164108 A1 | 6/2017 | Saggio | |
| 2017/0245044 A1 | 8/2017 | Cartwright | |
| 2017/0357947 A1* | 12/2017 | Ilan | G06Q 10/1095 |
| 2018/0191907 A1 | 7/2018 | Herrin | |

OTHER PUBLICATIONS

Wellner, Pierre D., et al.; Conference Scribe: Turning Conference Calls into Documents; HICSS '01 Proceedings of the 34th Hawaii International Conference on System Sciences; Feb. 2001; 9 pages.

Stavish, Matthew W.; List of IBM Patents or Patent Applications Treated as Related; May 8, 2019; 1 page.

* cited by examiner

US 10,819,855 B2

MANAGING, MONITORING AND TRANSCRIBING CONCURRENT MEETINGS AND/OR CONFERENCE CALLS

CROSS REFERENCE TO RELATED APPLICATIONS

This application is a continuation application claiming priority to Ser. No. 15/399,352 filed Jan. 5, 2017, now U.S. Pat. No. 10,334,110 issued Jun. 25, 2019 the contents of which are hereby incorporated by reference.

FIELD OF THE INVENTION

This invention relates generally to managing one or more meeting and/or conference calls, and particularly to transcribing one or more meeting and conference calls when conflicting meetings and conference calls are occurring.

BACKGROUND OF THE INVENTION

It is not possible for a user to participate in all the meetings and conference calls that the user has been requested to attend or desires to attend. For example, some conference calls run over their allotted time and may interfere with other scheduled calls. By not attending the meeting(s), the user is unable to obtain information from the meeting(s) and may miss important information conveyed during the call. Furthermore, most of moderators or chairpersons of the conference calls forget to record the conference calls or the meetings. Therefore, the user cannot obtain the recording of the conference calls or the meetings. When there exists a conflict between two or more conference calls, the user may miss one or more conflicting conference calls in order to participate in other conference calls. Additionally, conventional conference management systems depend on calendar systems to determine the absence or presence of an attendee to a conference call.

SUMMARY OF THE INVENTION

There provided a system, a method and a computer program product for managing multiple conference calls. The system, method and computer program performing the steps of receiving, by the computer, invitations to attend, by at least one attendee, two or more meetings, and detecting, by the computer, a one or more conflicts between meetings of the two or more meetings. The computer communicates, to the at least one attendee, at least one detected conflict of the one or more detected conflicts. The computer receives, from the at least one attendee in response to the communicated at least one detected conflict, an identification of a single meeting of the two or more meetings the at least one attendee will attend and at least one meeting of the two or more meetings to be transcribed. At least one meeting to be transcribed includes all meetings of the two or more meetings exclusive of the single meeting the at least one attendee will attend. At least a portion of the at least one meeting is transcribed into a first textual transcript and selectively delivered to the at least one attendee in real time.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE EMBODIMENTS

Figure 1:
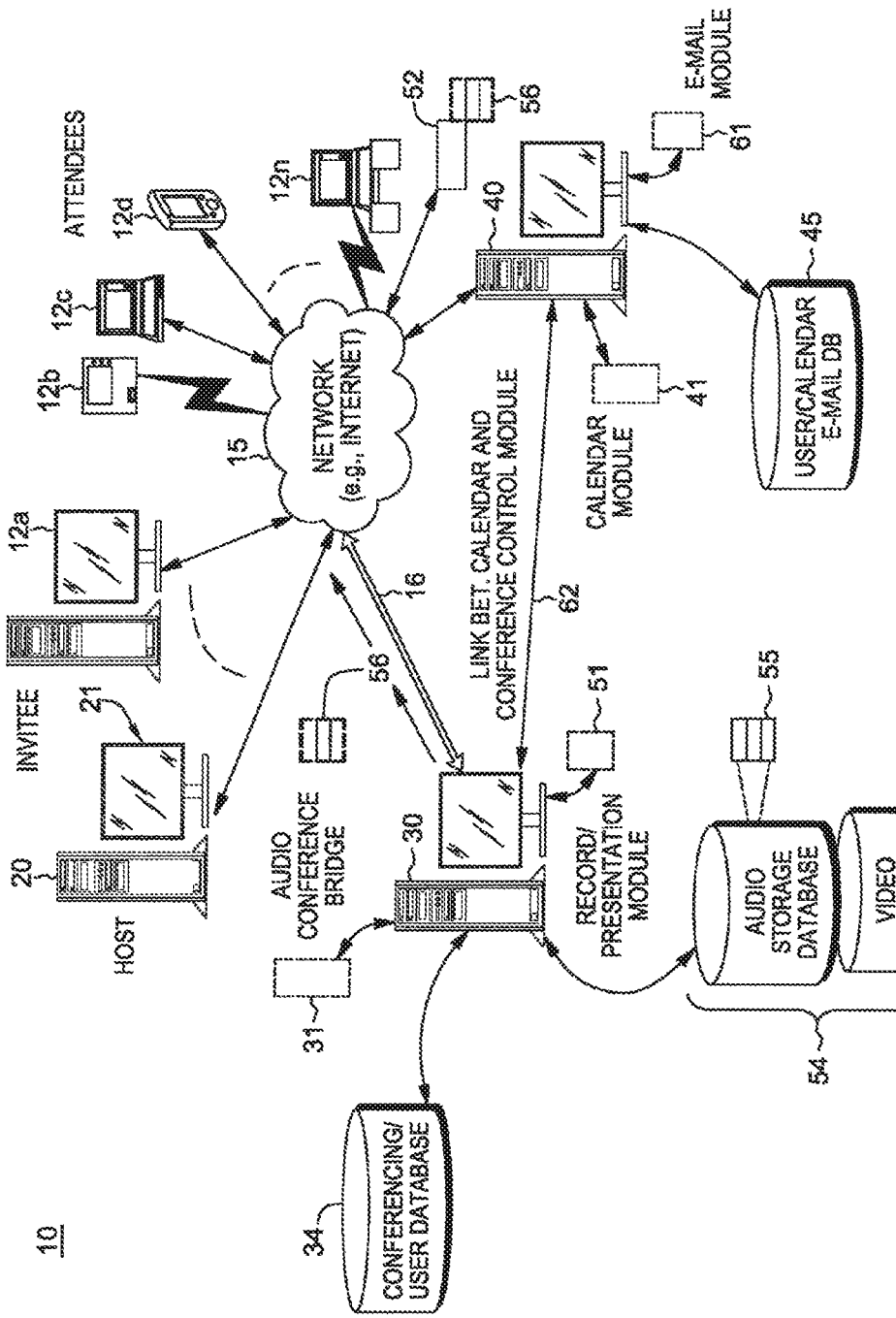
FIG. 1 illustrates an exemplary environment which includes one or more conferencing systems and client devices that include one or more electronic calendars in one embodiment.

The present invention provides a method and system to coordinate a meeting calendar with the calls a person is actually attending, and provides a transcript of what is occurring on whichever call the person is not attending to allow the attendee to make an informed decision when the person should transition between different meetings, as well as show any important facts that may occur near the end of a long running call and beginning of the new call. A method and system are disclosed to provide a textual transcript for a conference call when the participant has back-to-back calls that may overlap or two or more conflicting calls, wherein that participant needs to know what is being said in real time for the calls the participant chooses not to attend or has delayed attending. The live transcription service may be integrated into calendaring systems to recognize when overlapping calls are occurring, which call the participant is attending and not attending, and displaying in real time what is being said and by whom in a selected meeting automatically and in real time. According to the invention, the system is able to discern those meeting a user is in and then transcribes any meeting the user is not present by detecting, for example, location and/or attendance. Parts of a meeting that are being missed by a user are transcribed and shared, which provides a customized transcription of meeting or conference call with edge boundaries.

For example, on a network server, the system will determine that a participant is attending a first meeting and has a second meeting scheduled at the same time by (1) determining that a participant is attending a first meeting when the participant is dialed into the meeting conference call from a phone associated with the participant (e.g., office phone, cell phone, VOW, Skype); or by physical detection of a participant's presence, such as location info from a participant device (pc, phone, etc.), RFID badge detection, etc.; and (2) determining that the participant has a second meeting scheduled at the same time; whether there are overlapping meetings scheduled in a calendar, back-to-back meetings in a calendar, and the participant is still attending earlier meeting, or the participant is detected attending one ad hoc meeting with a second meeting scheduled in calendar at same time. For the second meeting (that the participant is not attending), the system will generate a real-time transcript for display on a device of the participant. Thus, the invention provides a system to: (1) determine if a participant is on a call in a room for a group call, (2) identify call attendance at adjacent, overlapping, and long running calls, and generate a transcript of the portion of the call(s) you were not in attendance, (3) provide partial transcript generation and switching based on location-based attendance, (4) provide transcript generation based on attendee permission to record/transcribe for the portion of a call a person missed, and (5) provide transcript generation based on an attendee's permission to transcribe.

If the participant switches attendance to the second meeting, the system provides the ability to switch the transcription service to generate a real-time transcript for the first meeting for display on a device of the user.

The system may also request and receive permission from attendees for transcription of the participants' speech. If permission is not given, the system will block or redact from the generated transcript. The system can also buffer for later integration of certain content into the transcription if permission is later given for a given conference call. A more detailed description of the aspects of this invention is provided below.

FIG. 1 is a diagram illustrating a communications network based; e.g., Internet/Web-based, conferencing system 10 established for reserving and enabling collaborative and/or on-line (audio only or audio/video) teleconferencing and other functionality described herein. As shown in FIG. 1, the conferencing system 10 comprises a computing device, including a control workstation or server 30, equipped with software applications and hardware to provide secure on-line connection service either through a local network, or over the Internet 15. The system 10 can include multiple servers; e.g., a server farm having one or more web/database servers, for example, wherein the control server 30 provides conferencing and other application functions for one or more on-line users, e.g., represented by user client devices 12a, . . . 12n which may be a computer, mobile computer, smart phones, personal digital assistants, or other personal digital devices or like device implementing a web-browser providing functionality for linking to a conference.

The conferencing system 10 includes known elements configured to enable any type of meeting in which several people or parties (attendees) can communicate using voice and/or data sent via connections established using separate or shared electronic networks.

FIG. 1 shows the control server 30 providing a conference calling system. More particularly, control server 30 provides for a conferencing session as may be initiated or scheduled by a presenter or session host; e.g., represented by a client device 20, for attendance by the one or more attendee (invitee) clients via their computing devices 12a, . . . 12n. A single user's calling device is alternately referred to as client device 12. In an embodiment, this conferencing session is established over the Internet 15; however, the functionality may be provided within a local network (LAN) or private intranet within an organization. Accordingly, the use of the Internet 15 as an exemplary computer network used for example purposes of illustration should not be construed to limit the scope or breadth of the present invention. The host client computer 20 and the attendee client devices 12a, . . . 12n may be any suitable computer such as a personal computer ("PC") or a laptop computer, each having a display, such as a video monitor or flat panel display for presentation, or a mobile phone (VoIP or POTS) or mobile computing device.

In one embodiment, call conferencing features of the present invention are facilitated by the use of the control server 30, which provides conferencing control functionality for an audio conferencing bridge module 31 that enables the real-time conferencing communications among the host client 20 and one or more attendee clients 12a, . . . , 12n. Accordingly, the host client 20 has an active control (not shown) which includes an application program running on the host's presenter client 21 to communicate with the conferencing bridge on the control server 30. This communication can take place via a computer network, such as the Internet 15.

Similarly, each one or more attendee client devices 12a, . . . , 12n, include software functionality that allows the attendee client's device or (VoIP or POTS) phone to partake in an audio teleconference. In teleconferencing, users communicate over the audio conferencing bridge 31 as programmed by a control module on a control server 30. In one embodiment, the communication between audio conferencing bridge 31 implemented in communication with the control server 30 and the host client 12, and the one or more attendee clients 12a, . . . , 12n takes place through a computer network, such as the Internet 15. Such communications are provided by VoIP communications. Network 15 may also comprise an Intranet, LAN, WAN networks, etc. Thus, FIG. 1 depicts an Internet based infrastructure implementing the system and methods described herein to modify an audio conferencing infrastructure in which the moderator or host client 20 and the attendee client(s) 12 use software functions to communicate with the control server 30 over a network such as the Internet 15.

Generally, the control server 30 implements functionality to provide an audio conferencing bridge services 31 enabling remote and desktop users for voice and data conferencing communications, and may include technology configured to support video conferencing including audio and/or standard and high-definition video for viewing both meeting participants and data collaboration. A database 34 storing information pertaining to user attendees/invitees of the organization or entity conference may be accessed by the control server 30. In operation, users via their client devices 12a, . . . , 12n may click on a link, e.g., via an e-mail notification message or a user's calendar entry, for connection to a scheduled conference. The system provides automatic firewall traversal (firewall not shown) to allow invitees to participate regardless of the invitee's location.

Further shown as running on a separate calendaring server 40 (or in other embodiment, running on the control server 30 itself) is a calendar database system module 41 that enables calendaring server 40 to provide services to allow individual users, invitees who may be persons operating one of clients 12a, . . . , 12n, to maintain individual electronic calendars on system 10. The information regarding each individual user's electronic calendar is maintained as user calendar data in a user calendar database 45. More specifically, user calendar database 45 generally includes one or more data structures that hold data indicating a user/invitee and zero or more appointments for that user, including data indicating a start date and time and stop date and time for the appointment.

It is understood that wired communications between and amongst the servers 30 and 40 and any of the user clients 12a, . . . , 12n may be via the public Internet 15 in accordance with standard TCP/IP protocols and optionally, over a secure communications link, e.g., secure sockets layer or similar protocol.

The calendaring services provided by calendar module 41 of the server 40 (forming a calendar database system) can be accessed using electronic calendaring applications (not shown) residing on client devices 12a, . . . , 12n. Calendar database system on server 40 can accept individual electronic calendar appointments for each individual user's electronic calendar, and each of the accepted appointments may include a start date/time and either a stop time or duration of the appointment on a particular day or days. Calendaring server 40 may further store and access information related to a calendar of events for users of clients 12a, . . . , 12n.

In a further embodiment, server 40 may further provide electronic "e-mail" services infrastructure provided by an e-mail program module 61 of the server 40 (forming a functional e-mail system). In one embodiment, electronic "e-mail" services infrastructure is integrated as part of or within the calendaring system, or is operated separate there from. E-mail programs, such as Microsoft Outlook® or Exchange® provided on client devices 12a, . . . , 12n can be used to access/receive and generate/send e-mails via server 40 to any recipient via network 15.

The calendar/e-mail system module 41 via server 40 can also be configured to allow a user; e.g. a host, via a host computing device 20, to operate an electronic calendaring application to organize a meeting by specifying a time, a date, a duration, and a list of invitees, e.g., attendees, for the meeting for the users individual electronic calendars on the invitee's devices 12a, . . . , 12n, and send electronic messages notifying each invitee of the meeting and allowing the invitees to accept or decline participation in the meeting. Calendar database system 40 can further be configured to add an appointment that corresponds to the meeting to the individual electronic calendar of each user specified.

In FIG. 1, there is provided a further illustrative embodiment of a teleconference call record/playback infrastructure which may be incorporated in the services functionality of the control server 30 or another server device. For purposes of illustration, control server device or computer 30 includes an associated record playback and transcription control module 51 configured to run software that manages recording, transcribing, and storage of audio conference calls, audio or audio/video collaborative presentations, etc., rendering control server 30 as a media server. The recordings and transcription of audio conference calls, or audio/video data may be stored as files 55 on one or more connected memory storage devices 54 in communication with the control server 30. Associated record playback control module 51 is further responsive to signals for accessing and delivering prior recorded/stored audio and transcription conferencing playback files 55 through network 15 for replay on a user's playback device associated with client device 12a, . . . , 12n, which may, for example, be a computing device including a video monitor or flat panel display and/or audio speakers 52 associated with the user/invitee client device 12 for presentation. For example, the playback client 52 shown in FIG. 1 may include a media player application such as Windows Media Player, or QuickTime Player available from Apple Computer of Cupertino, Calif. or any other display device for displaying a transcript of the dialog of the conference call in question.

Particularly, when a conference call is scheduled, via the control module 51, the host may exercise an option to initiate functionality to record and transcribe the call or not via control functionality provided by record/playback server 30. In the case of a recorded call conference, a transcription of the call content may be stored on a media storage device 54 connected with the control server 30, which may include memory storage devices for storing audio files, video presentations or both as playback files 55 that are to be subsequently played back on a playback client device. A playback file 56 can contain a transcription of the conference call and/or a recording of media presented during a collaborative communication or teleconference session as shown as the final recording file 55 in FIG. 1. As shown, the system 10 of FIG. 1 illustrates an embodiment where the file 55 stored on a storage device 54 under control of module 51 is configured as playback file 56 that is delivered or streamed via a communication path 16 to a playback client 52 through network 15.

The playback client 52, in an example embodiment, may also be connected to the playback servers 20 and 30 through a network 15, such as the Internet 15. In one embodiment, the playback client 52 may receive for replay a file of the transcript of a conference call session in real time or after the call has been recorded. Typically, after a conference call is being broadcast; e.g., over the Web, when the session is complete and the audio and/or visual events have been recorded, the playback client 52 is available to enable a user to later review the session. Thus, FIG. 1 depicts an example of a playback client 52 replaying a previously recorded conference call, such as an audio file 56, over a network 15. Alternatively, the session may be transcribed in real time and delivered or streamed via a communication path 16 to the playback client 52 through network 15 for real time viewing.

Further, via instructions provided in software control modules 31, 41 and 51, each of server devices 30 and calendar server 40 are in communication with each other to enable the functionality as described herein below. For example, control and record/playback server 30 communicates with calendar/e-mail server 40 via a network communications link 62.

It should be understood that the infrastructure shown in FIG. 1 is illustrative, and not limiting. Several network configurations and connection methods can be employed without departing from the description herein. For example, all functionality described herein may be consolidated in a single server device and a single memory storage device.

For purposes of description, a "bot", "monitoring agent", "synching agent" or a "proxy agent" is a computer program component (a specialized software agent) operating on computer systems and communicated over a communications infrastructure. In one embodiment, a bot may implement voice over IP (VoIP) or like communications technology.

Via the example infrastructure of FIG. 1, each of the conferencing control module 31, e-mail/calendar control module 41 and record/playback control module 51 respond to a 'bot' providing instructions configuring a server 30 and/or servers 40 to perform and provide functionality described herein.

Figure 5:
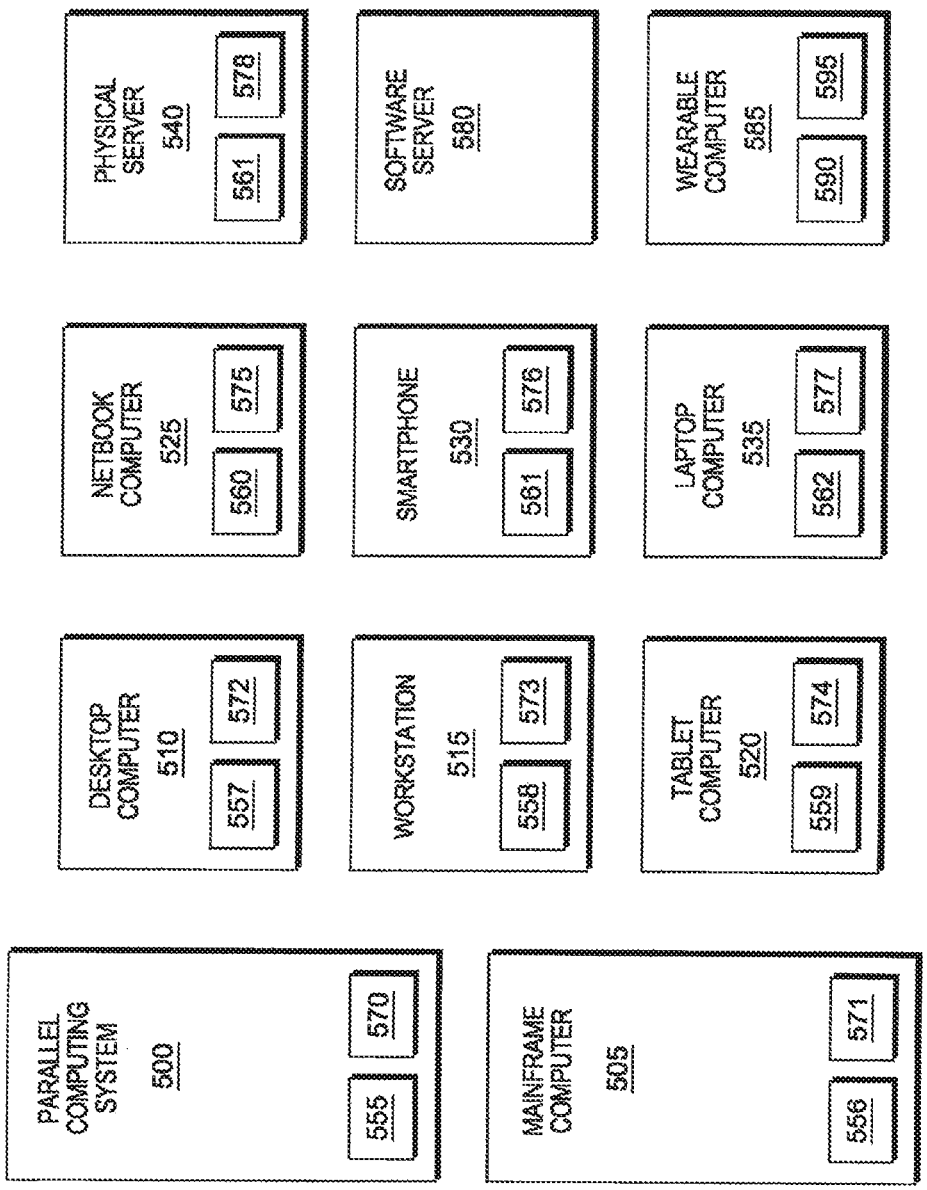
FIG. 5 illustrates exemplary hardware configurations for performing method steps shown in FIGS. 2-4 and 6, according to embodiments of the present invention.

In one embodiment, a system (e.g., a computing system as shown in FIG. 5) makes intelligent decisions, e.g., by using a machine learning technique—a decision tree, supervised learning, etc., on behalf of a user regarding the recording of conference calls for which the user is not able to attend. For example, upon checking one or more electronic calendar entries of the user, the system may decide to record and transcribe one or more conference calls. During the one or more conference calls, the user may perform tasks other than attending the one or more conference calls.

The system allows a conference call (or video call) user an opportunity to receive information (i.e., contents, transcription) of that conference call whether or not a moderator (i.e., a host for the conference call) decides to record the conference call. For example, even if the host of the conference call does not allow recording of the conference call, the user may send a bot (also called "proxy agent") to a corresponding on-line electronic meeting. The bot may include, but is not limited to: an Internet software robot; i.e., a software application that performs automated tasks over one or more networks. The bot may record and transcribe the conference call on behalf of the participant. The bot may be written by a high-level programming language, a script, an assembly language, and/or binary code. The bot may further include, but is not limited to: a digital audio recorder, a digital video recorder, an avatar that represents the participant, a speech recognition software program that converts audio and/or a video data to texts, a transcribing software program, VoIP (Voice over IP), a technology to automatically configuring a conference call, an automatic log-in technology to automatically participate in an on-line electronic meeting on behalf of the user, other software functionalities. Upon determining that the user cannot attend the conference all, the user may, for example, press an icon that appears on a corresponding electronic calendar entry of the participant. In response to the pressing the icon, e.g., via a communication signal that encodes the pressing the icon, the bot may appear on the on-line electronic meeting. In one embodiment, the host may not recognize the absence of the user in the on-line electronic meeting because the bot may represent the attendance of the participant. During the on-line electronic meeting, the user may perform one or more tasks instead of actually attending the on-line electronic meeting. Upon the host finishing the on-line electronic meeting or while the meeting is in progress, the bot may send the audio or a transcript of the audio to the user; e.g., by an email attachment (for example, a text file, an audio file, etc.) that contains the contents of the on-line electronic meeting. The bot may include an interface that the user can control. Through the interface, the user may indicate what portions (or what parts) of the meeting to be recorded and/or transcribed. The bot may record and transcribe only those portions or those parts of the meeting.

In another embodiment, the host may recognize the absence of the user upon identifying the bot, which represents the user, in the on-line electronic meeting (software or hardware) tool. In this embodiment, if the user actually attends the on-line electronic meeting, the on-line electronic meeting may present a software agent that may include the same feature as like the bot that appears during the absence of the user in the meeting. The distinction between the bot and the software agent may include, but is not limited to: each different color, each different functionality (e.g., instant messaging feature may exist in the software agent in the way the user can communication in real-time with other meeting participants via the instant messaging), etc.

In accordance with this invention, the user may view a real time transcription of the content of the meeting while, for example, attending another meeting.

In a further embodiment, upon receiving the recording and/or transcription, the electronic calendar of the user, e.g., IBM®, Lotus®, Notes®, etc., may automatically schedule a date and time to playback the recording or transcription for the user. For example, the electronic calendar may make an entry in the electronic calendar in an available time slot during which the user has not make any entry. The duration of the made electronic calendar entry may be longer than or equal to the duration of the on-line electronic meeting. The electronic calendar system, which may integrate an electronic email system, may be able to identify the duration of the on-line electronic meeting based on corresponding file attachment information. For example, tag (or tag field) data of a text or MP3 file may include time duration necessary to playback the text or MP3 file. The electronic calendar of the user may play the recording or transcription in an automated fashion; e.g., by automatically starting a multimedia player at the beginning of the available time slot. The electronic calendar may notify the user prior to playing the recording; e.g., 10 minutes prior to playing the recording as scheduled to a corresponding date and time as indicated on the made electronic calendar entry. The bot may provide a conference call (or video call) user an opportunity to receive the information of the conference call whether or not the conference call host decides to record the conference call or not. In a further embodiment, the electronic calendar of the user may embed the transcript or recording, e.g., text or MP3 file, in the made electronic calendar entry. Alternatively, the electronic calendar of the user may post a link (e.g., hyperlink, etc.) to the recording or transcript in the made electronic calendar entry.

Figure 2:
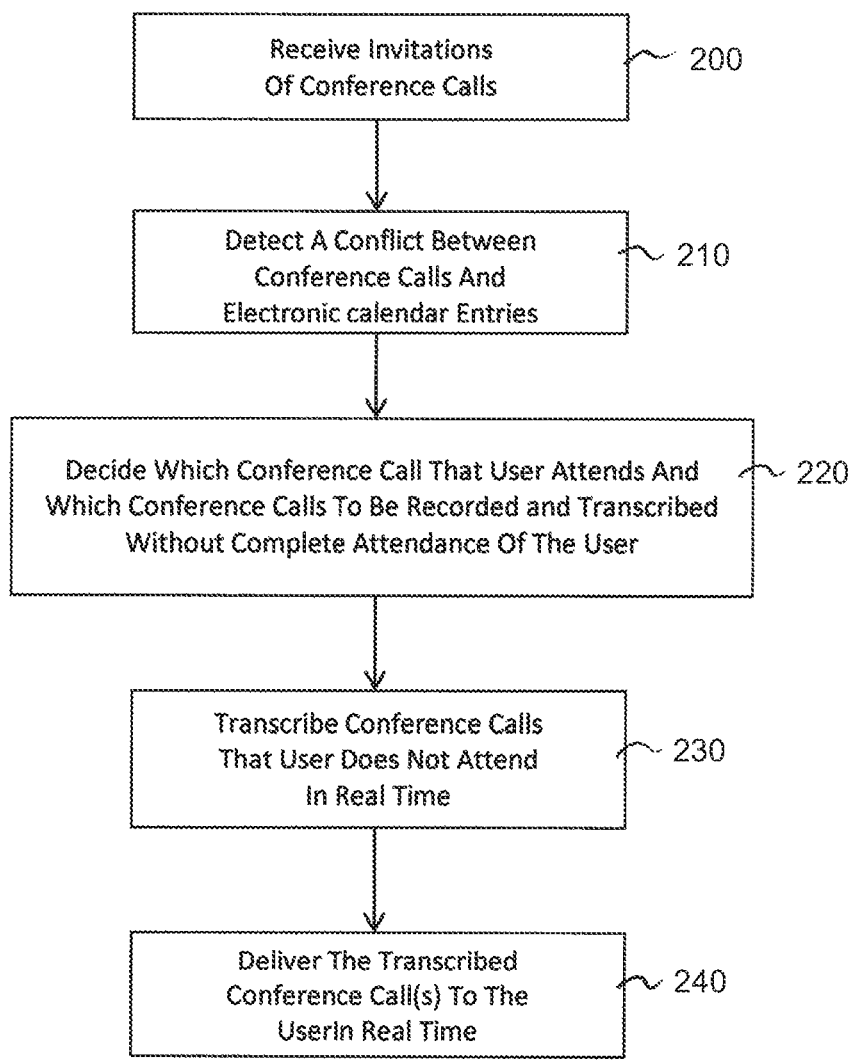
FIG. 2 illustrates a flowchart that describes method steps for managing a conference call, according to one embodiment of the present invention.

FIG. 2 illustrates a flowchart that describes method steps for managing a conference call. At step 200, the user receives invitations of one or more conference calls. Alternatively, the electronic calendar may automatically accept electronic conference call invitations regardless of the user's schedules posted on the electronic calendar. At step 210, the electronic calendar automatically detects a conflict between the one or more conference calls and electronic calendar entries.

At step 220, the user decides which conference call the user attends and which conference calls, or portions thereof, to be recorded and transcribed without an attendance of the user when there exists the detected conflict. For example, if the user chooses not to attend an on-line electronic meeting; e.g., by selecting "no" button or option on the notification, the electronic calendar may automatically send a communication signal that requests that user's bot appears and/or attends during the meeting. The bot records and transcribes in real time the conference call(s) that the user is not attending at step 230. Alternatively, the communication signal automatically triggers an automatic event that automatically initiates these conference calls to be recorded and transcribed. At step 240, the bot delivers the transcription of those conference calls to the user for real time for viewing on a desktop, laptop, handheld device or other suitable display. The user may store the recording, for example, in a storage device. Alternatively, the electronic calendar which integrates the electronic email system may automatically store the file (i.e., the transcription) in one or more file folders designated by the user. The user may view the transcription in real time or may choose to playback the recording whenever the user wants. Alternatively, the user may not play the recording at all but may still store the transcription, e.g., text file, in a storage device of the user.

In a further embodiment, the bot monitors whether the user joined the conference calls that the bot attends; e.g., by detecting that a caller ID of the user appears in a corresponding conferencing system.

Figure 3:
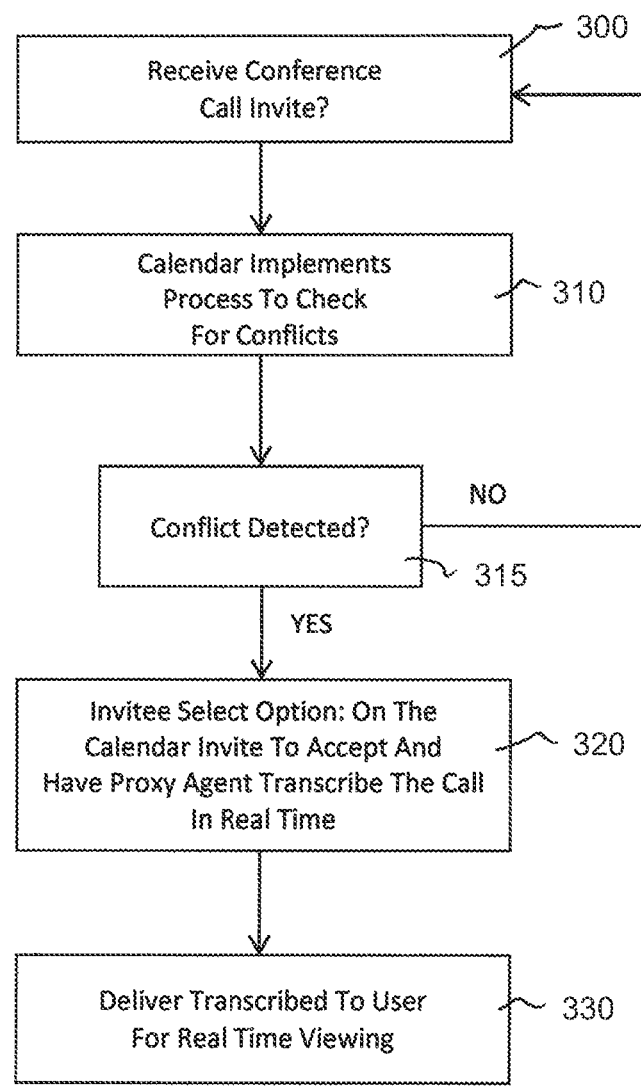
FIG. 3 illustrates a flowchart that describes method steps for recording, by the bot, a "conflicting" conference call where the user is unavailable to attend an electronic conference call due to a scheduling conflict, according to one embodiment of the present invention.

FIG. 3 illustrates a flowchart that describes method steps for recording, by the bot, a "conflicting" conference call where the user is unavailable to attend an electronic conference call due to a scheduling conflict in one embodiment.

At step 300 of FIG. 3, the electronic calendar of the user receives a conference call invitation; e.g., via an on-line electronic meeting invitation. At step 310 of FIG. 3, the electronic calendar evaluates whether there exists a conflict between user's scheduled entries posted on the electronic calendar and a schedule of the conference call. For example, the electronic calendar evaluates whether there exists an overlap between a date and time of the conference call and schedules of the user. Upon detecting no overlap between the date and time of the conference call and schedules of the user, i.e., a conflict, the control returns to step 300 to monitor receipt of a new conference call invitation. The electronic calendar makes an entry corresponding to the date and the time of the conference call.

At step 320 of FIG. 3, upon detecting the conflict at step 315, the electronic calendar or the user accepts the invitation and the proxy or synchronizing agent transcribes the call. As described below, the agent may be instructed to transcribe only portions of the call and, likewise, may be instructed to switch back-and-forth between conflicting calls thereby providing a transcript of portion of one call when the user is not available, i.e., because the user is listening to another call.

At step 330 of FIG. 3, the system further sends the transcript of the call to the user for real-time viewing on a suitable display.

In one embodiment, the conferencing system may prevent the bot from recording and/or transcribing the conference call, e.g., by disabling an integration of the bot in the conferencing system or by overriding functionalities of the bot with other functionalities. A conference call chairperson can specify when sending the on-line electronic meeting invitation that the bot or recordings of the meeting are not permitted.

In one embodiment, upon receiving on-line electronic meeting invitations, the electronic calendar or the user detects a conflict between user's schedule and the on-line electronic meeting. Upon detecting the conflict, the user decides which on-line electronic meetings the user will attend and which on-line electronic meetings are to be recorded and transcribed.

In one embodiment, the bot monitors whether or not the user has joined the conference call, e.g., during or beginning of the conference call; e.g., by detecting a voice of the user by using a known voice recognition technique, etc. In one embodiment, the bot automatically calls in the conference call number and fully or partially records the conference call for the user.

The electronic calendar of the user configures the bot to appear in (or attend) the on-line electronic meeting (software or hardware) tool during the on-line electronic meeting. The bot provides a real-time transcript of the contents of the meeting, e.g., by using a known electronic transcription software, etc. The bot provides the real-time transcript to the user via one or more instant messages or one or more emails. By reviewing the real-time transcript, the user may decide whether to temporarily join the meeting that the bot attends. If the user joins the meeting in the middle of the meeting, the bot may disappear and the software agent may appear in the on-line electronic meeting (software or hardware) tool to indicate the attendance of the user.

The electronic calendar of the user may allow a priority setting: for example, an on-line electronic meeting invitation from a particular person may have the highest priority and therefore overrides tasks scheduled during that on-line electronic meeting. Each recording and transcription may have a different priority. The electronic calendar may schedule a higher priority transcription to be viewed by the user before the user views a lower priority transcription. The user may determine the priority setting; e.g., by user's preference. The user may be able to change the priority setting anytime; e.g., via a graphical user interface (not shown) of the electronic calendar.

The electronic calendar of the user that allows the user to make the bot appear on a conference call/video/web meeting (software or hardware) tool to record and transcribe one or more aspects of the meeting (contents of the meeting, transcription of the contents of the meeting, length of the meeting, who attended during the meeting, etc.). The bot sends the recording and/or transcription to an information repository (e.g., database, etc.), either local or remote, and provides a link to the transcript (or a corresponding file of the transcript) to the user who did not attend the meeting.

Figure 4:
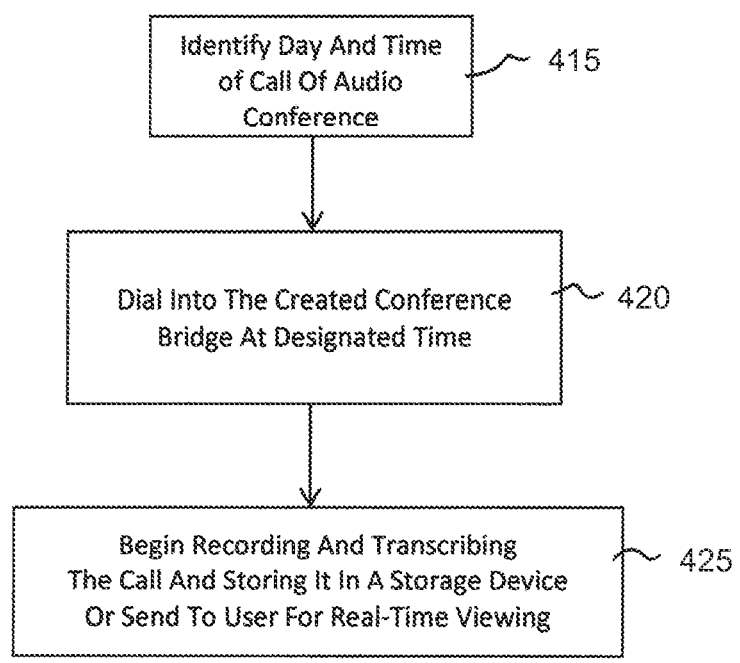
FIG. 4 illustrates a flowchart that describes method steps for automatically recording a conference call, according to one embodiment of the present invention.

FIG. 4 illustrates a flowchart that describes method steps for automatically recording a conference call in one embodiment. At step 415, the electronic calendar identifies a date and a beginning time of an on-line electronic meeting. At step 420, the electronic calendar automatically calls in or connects to a corresponding on-line electronic meeting system. The user sends the communication signal; e.g., by selecting or pressing a specific button (or icon) (not shown) of a corresponding electronic calendar entry of the meeting, to the corresponding on-line electronic system. At step 425, the bot records and transcribes contents of the meeting and stores the recording; e.g., in a data storage device or a web server device, etc., or embeds the recording in a web page. In one embodiment, the bot may deliver the transcript to the user for viewing in real time.

In one embodiment, the bot may send a keyword of an on-going conference call to a user; e.g., by applying a known electronic summarization technique to the real-time transcript of the on-going conference call. Then, the user determines whether to attend the conference call in the middle of the conference call. In one embodiment, a host of the conference call may turn on or turn off one or more functionalities of the bot; e.g., by disabling a transcription function of the bot.

In one embodiment, the user may request a real-time text transcription of an on-line electronic meeting to the bot. In this embodiment, the electronic calendar system initiates an instant messaging tool and automatically logs in the instant messaging tool; e.g., by using a user's account of the instant messaging tool. The bot appears in a corresponding on-line electronic meeting (software or hardware) tool during the on-line electronic meeting. The bot performs a real-time voice to text conversion on contents of the meeting; e.g., by using a known transcription (or subtitle) software. The bot sends the transcript, in an appropriate length; e.g., via one or more instant messages, etc., to the user. When the meeting is finished, the bot sends to the user an email with an entire transcript of the meeting.

In one embodiment, the conferencing system disables the bot if a corresponding user actually attends the meeting. This disabling of the bot due to the attendance of the user can be implemented by using one or more of: a voice detection of the user during the meeting, integration with caller ID at the conferencing system, and a detection of a caller ID of the user during the meeting, integration with user's VoIP telephony system, etc.

In one embodiment, a computing system may run the method illustrated in FIGS. 2-4 and 6. FIG. 5 illustrates examples of the computing system. Examples of the computing system may include, but are not limited to: a parallel computing system 500 including at least one processor 555 and at least one memory device 570, a mainframe computer 505 including at least one processor 556 and at least one memory device 571, a desktop computer 510 including at least one processor 557 and at least one memory device 572, a workstation 515 including at least one processor 558 and at least one memory device 573, a tablet computer 520 including at least one processor 556 and at least one memory device 574, a netbook computer 525 including at least one processor 560 and at least one memory device 575, a smartphone 530 including at least one processor 561 and at least one memory device 576, a laptop computer 535 including at least one processor 562 and at least one memory device 577, a physical server 540 including at least one processor 561 and at least one memory device 578, a software server 580, e.g., web server, HTTP server, application server, or a wearable computer 585, e.g., smart watch, etc., including at least one processor 590 and at least one memory device 595.

Figure 6:
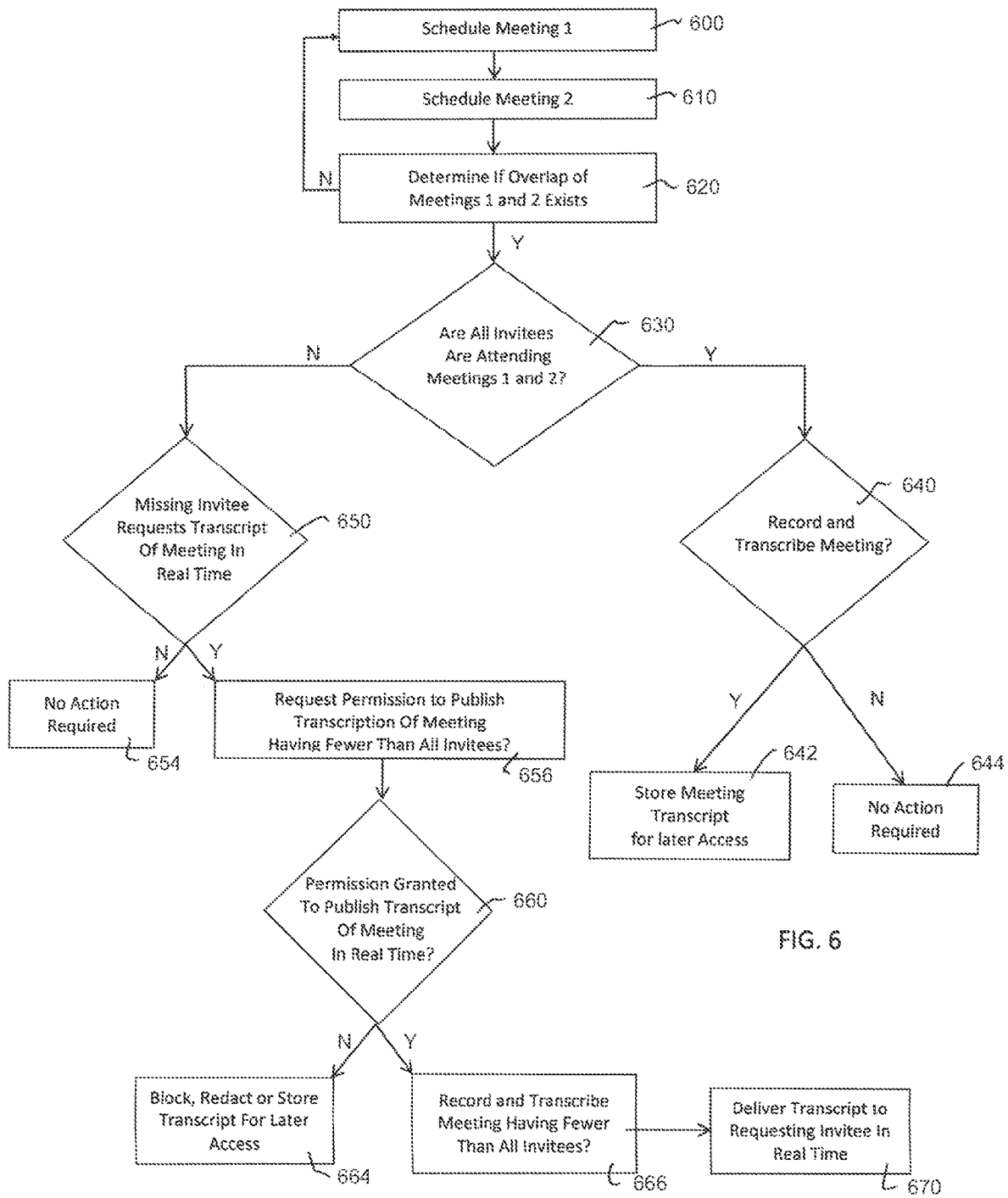
FIG. 6 illustrates a flowchart that describes method steps for managing one or more conference calls in one embodiment of the present invention.

FIG. 6 illustrates a flowchart that describes method steps for recording a "conflicting" meeting call where the user is unavailable to attend a meeting due to a scheduling conflict, according to one embodiment of the present invention. All of the steps to follow are performed by the appropriate computer, program or system described herein. It is noted that the present invention is directed to transcribing the dialog of at least one meeting where a participant cannot attend part or all of the meeting due to a conflict. While this invention has been described with reference to various conference calls, the invention is not limited to conference calls and may be employed to generate a transcript of meeting dialog as described herein. At step 600 of FIG. 6, the electronic calendar of the user receives a meeting invitation; e.g., via an on-line electronic meeting invitation and schedules a first meeting (Meeting 1). At step 610 of FIG. 6, the electronic calendar of the user receives a second meeting invitation; e.g., via an on-line electronic meeting invitation and schedules a second meeting (Meeting 2). At step 620 of FIG. 6, the electronic calendar evaluates whether there exists a conflict or overlap between user's scheduled entries posted on the electronic calendar and a schedule of Meeting 1 and Meeting 2. For example, the electronic calendar evaluates whether there exists an overlap between a date and time of the meeting and schedules of the user. Upon detecting no overlap between the date and time of the meetings and schedules of the user, i.e., a conflict, the control returns to step 600 to monitor receipt of a new conference call invitation. The electronic calendar makes an entry corresponding to the date and the time of the conference call.

At step 630 of FIG. 6, upon detecting the conflict at step 620, the electronic calendar or the user evaluates whether all invitees are attending Meetings 1 and 2. If all invitees are attending the conflicting meeting or if the invitees plan to simultaneously attend each meeting, the system at step 640 queries whether one or both meetings should be recorded and transcribed for future download or review. If step 640 determines that one or both meetings should be recorded and transcribed for future download or review ("YES" branch), then the method will store the meeting transcript for later access at step 642. If step 640 determines that one or both meetings should not be recorded and transcribed for future download or review ("NO" branch), then the method takes no action as shown at step 644. If all invitees are not attending Meeting 1 and 2, the method prompts the missing invitees to request a transcript of the meeting in real time at step 650. If an invitee does not request a transcription at step 650, then no further action is taken as shown by step 654. If an invitee does request a transcript of a meeting in real time, the method requests permission to publish the transcript of the meeting of the other attendees or a meeting coordinator at step 656. At step 660 of FIG. 6, the system determines whether permission is granted to publish the transcript of the meeting as requested at step 656. If permission is refused at step 660, then the system blocks, redacts, and/or stores the transcript for later access at step 664. For example, the system may redact only those portions of the transcript where one participant has refused to grant permission to publish; only that participant's contribution to the dialog will be redacted. Alternatively, the entire transcript may be blocked and stored for later viewing at step 664. If permission to publish the transcript is granted by all participants to the meeting, then the system will record and/or transcribe the dialog of the meeting in real time at step 666. Next, at step 670, the system will deliver the transcript to the requesting user or invitee in real time for viewing on a suitable device such as a computer or handheld display unit; i.e. a cellphone or tablet. As described herein, the method may transcribe only portions of the call and, likewise, may switch back-and-forth between conflicting calls thereby providing a transcript of portion of one call when the user is not available; i.e., because the user is listening to another call.

In one embodiment, the methods shown in FIGS. 2-4 and 6 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIGS. 2-4 and 6 may be implemented on a semiconductor chip, e.g., ASIC (Application-Specific Integrated Circuit), by using a semicustom design methodology, i.e., designing a semiconductor chip using standard cells and a hardware description language.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
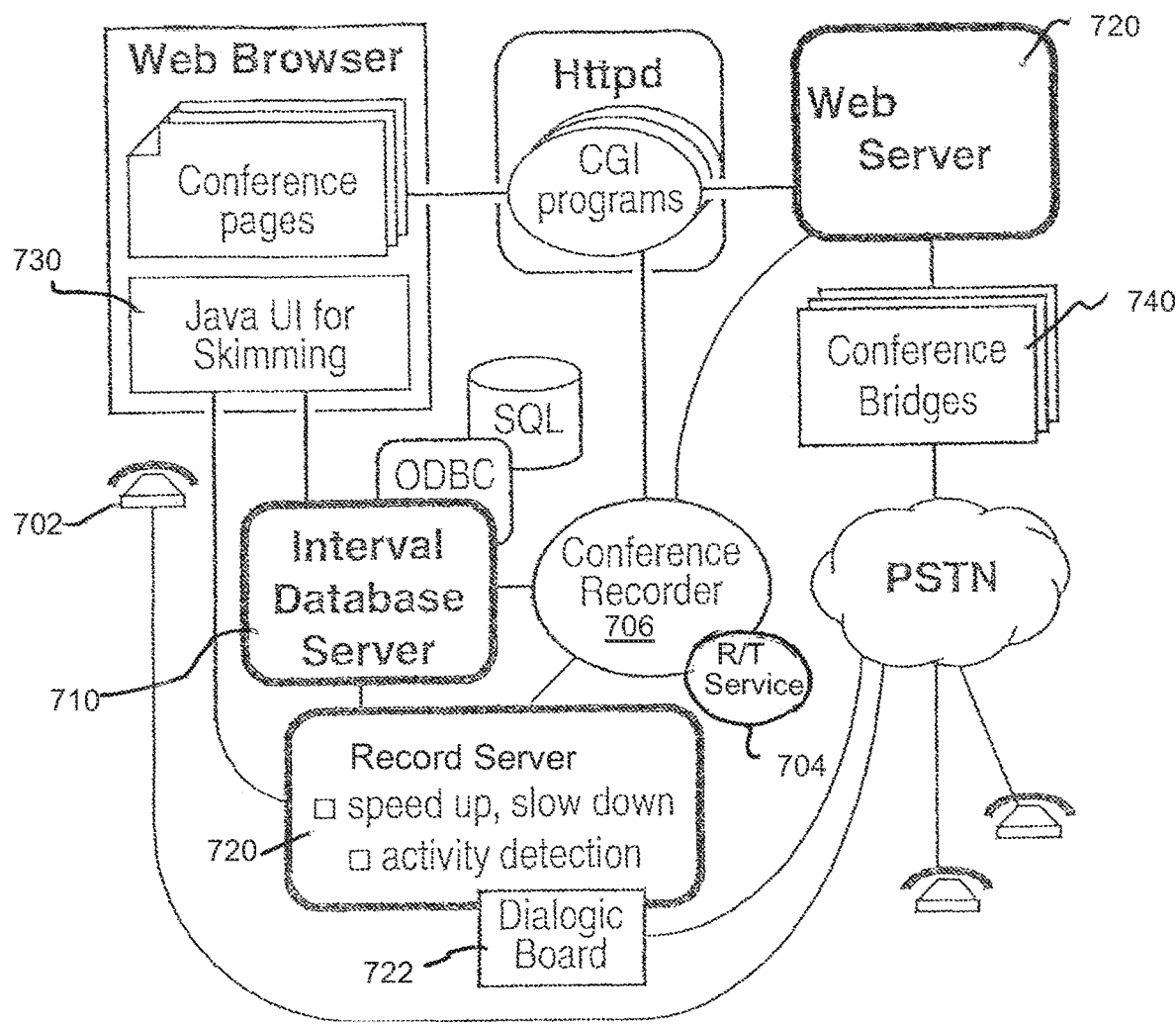
FIG. 7 illustrates an example of system components, according to one embodiment of the present invention.

According to one embodiment, the system includes the components shown in FIG. 7, including the conference recorder/transcription processor 706, record server 720, Interval Database (IDB) server 710, and the Java user interface 730. FIG. 7 illustrates an example of the system component, according to one embodiment of the present invention. At record time, the conference host 702 may use a web server 700 to dial the record/transcription service 704 as an additional participant to the conference. At the same time, a conference recorder/transcription processor 706 tells the IDB server 710 to create a new collection point (depot) for storing all data related to this particular recording, and it tells the record server 720 to begin recording an audio file using a dialogic board 722. While the conference is running, the conference bridge 740 detects call control events, which participant is talking, etc. and sends these call control events through web server 700 and the conference recorder/transcription processor 706 into the new depot.

Meanwhile, the record server 720 detects pauses in speech and adds these events as well. At playtime, the user brings up a Java user interface 730 to select a transcript accessed via the IDB server 710. The interface retrieves labeled interval data for this transcript and uses them to display a visual timeline of events. The user enters a phone number that is passed to the record server 720 so it can call the user's telephone for conference playback through the dialogic board 722. As the transcription plays on the user's phone, the Java UI 730 continuously updates the graphical display and controls how the transcription is displayed using the record server 720. Clients and servers communicate through application programming interfaces, such as CORBA, making it easy for programs written in different languages running on different platforms to work together. Web server 700 and the conference recorder/transcription processor 706 may run on Sun Solaris platforms, while the DB server 710 and record server 720 may run on Windows NT or similar systems. The invention is not limited to these systems and may be performed on any suitable platform.

The record server 720 performs the following functions: records audio from telephone line to file; detects speech events while recording and post them to the interval database 710; plays from file to telephone line: (a) from any point in recording; (b) at variable speeds, and (c) with pauses removed or not.

The record server 720 may be based on the same type of hardware as standard voicemail servers, and it performs many of the same functions. The main difference between the record server 720 and a more traditional voicemail server is that it processes speech events and posts them to the DB server 710, and also that it provides fine control over what parts of the audio file are transcribed and what parts are skipped.

Any system that supports browsing and visual display of archived speech needs to store and retrieve labeled interval data. The labeled interval data is data that describes properties about specific intervals within the speech, such as who is talking, pauses in speech, telephone call control data. The labeled interval data can be further extended to applications that require intervals that mark video scene changes, or relate automatic speech recognition output to a recording. For example, each interval data element must include a reference to a specific speech recording, a start time, end time (or duration), and type-specific data. The labeled intervals can be created, stored, and retrieved by a number of different applications. Some are automatically derived from raw speech data, some are side effects of user activity, and others may be entered manually at record time or at play time. In any event, the data is processed and delivered to a transcription service for transcription into suitable text format.

All applications that post events to the IDB may specify precise millisecond offsets for start and end times of each interval. All offsets may be from an absolute start-time for the recording. Posting intervals from different machines in real-time requires all clients that are posting events have synchronized clocks, so standard NTP software is run on all of these machines.

Transcriptions can be stored as interval data, perhaps one sentence per interval, or one word per interval depending on how fine a mapping is desired between words and time. The transcriptions may be produced from closed caption text, higher quality off-line transcriptions, or a lower quality automatic speech recognition system, and other suitable transcription platforms known to those of skill in the art.

In accordance with one embodiment of the present invention, a method and system provides a textual transcript to a conference call when the participant had two or more conflicting calls, and needs to know what is being said in real time for the calls they choose not to attend or delay attending. The live transcription service would be integrated into the conference call and/or calendaring systems to recognize when an overlapping call is occurring, which call the person is attending versus which they are not, and displaying in real time what is being said and by whom automatically.

The system has a synching agent that watches which conference calls the participant is currently connected. The synching agent has a profile that is setup with a user's account information (e.g., phone number dialing from, VoIP application dialing in from like Skype, calendar service, email, name). This profile information can be gathered from user's calendar system and/or company profile held in LDAP, which is an open, vendor-neutral, industry standard application protocol for accessing and maintaining distributed directory information services over an Internet Protocol (IP) network.

To determine when an overlapping call is occurring the system interfaces with the conference call system to determine if this particular user just disconnected from a call (which is still ongoing) and reconnected to a different call. Also the system can interface with a user's calendaring system and observe that two calls are either back to back or overlapping and the prior call is still going (after the scheduled time) and the later call is also active, and then determine which call the user is actually listening too. Additionally, if a call is taken from a conference room use location data from a mobile device to compare the meeting location with the calendar entry as an indication which call a person is attending.

When two or more overlapping calls are detected the system attempts to display a text transcript in real time of the call that the user is not listening to. The system connects to the "monitoring agent" (described below) to capture and display spoken text and may permission to display what was said to the requesting user.

If the user switches back and forth between calls, then the system switch the transcript to show whatever call the person is not listening to.

A dialog is displayed showing what was said and by who and when it was said. If there is no permission given that information is redacted/blocked out for the parts spoken by individuals that did not give permission.

Although this invention has been described with reference to two overlapping calls, the same method and system may be applied to two or more calls and the system would work the same, recording information for whatever call(s) the person is not listening to.

The system may employ an agent to monitor calls, referred to in one embodiment as the monitoring agent. In this embodiment, the system detects who is connected on a call and when someone leaves the call using identity information from the participant (e.g., telephone no., ip address, location, meeting room, etc.) The system also determines who is talking based on known techniques as known to those of skill in the art. The system may require permission from anyone speaking before the words are shown in a transcript. In one embodiment, the system will cache text for a particular person until the give permission and rebuild the transcript in the correct chronological order since it may take some speakers longer than others to respond to requests. If someone does not give permission you will receive the person's name so you can ask them offline what was said. Alternatively, the system can assume permission or have a default where permission is assumed by the nature of the connection to the conference call (e.g., the participant would be warned that part or all of your conversation may be recorded).

The following two examples provide simplified scenarios of how the method and system of this invention would operate.

Scenario 1: John, Sue, Linda are each individually dialed into a conference call scheduled (Meeting 1) from 3 pm-4 pm. Sue also has a 4 pm-5 pm call on Sue's schedule (Meeting 2) with attendees—Jarrett and Brad. Meeting 1 runs long by 5 min as there's a sales opportunity being discussed, so Sue decides to stay on Meeting 1 until it ends at 4:05, then dials into Meeting 2 at 4:06.

Based on this scenario, the method and system of this invention would function as follows: at 4 pm, Meeting 2 is started, but Sue did not dial in. The system would detect that Sue was still on the Meeting 1 call. The system would make a request to the attendees of Meeting 2 (Jarrett and Brad) that it is ok to record and transcribe the meeting for Sue. If Jarrett and Brad say "yes", the system begins capturing what Jarrett and Brad are saying and sends the transcript to Sue, who views the dialog on Sue's computer or other suitable device in real time. At 4:06 when Sue joins the Meeting 2 conference call, the transcription for Sue stops.

Scenario 2: John and Sue are on a conference call in a meeting room scheduled (Meeting 3) from 2 pm-3 pm. Linda is also on the call but calling from home. Sue also has a 2:45 pm-3 pm call on her schedule and calendar (Meeting 4) with Sue's manager, Ken. Meeting 3 runs as scheduled from 2 pm-3 pm, but Sue needs to walk back to Sue's office to dial Sue's manager's conference number. Sue desires to hear the rest of the conversation between John and Linda, but Sue doesn't want to be late for Sue's call with her manager, so Sue leaves at 2:40 pm to walk to Sue's desk and joins the call with Sue's manager on time at 2:45.

Based on this scenario, the method and system of this invention would function as follows: the system would determine that Sue is in room A100 along with John and (with Linda dialed in) by matching the calendar entry with the attendees and room reservation and cross referencing via GPS on Sue's phone. When Sue walks out of the room to go back to Sue's office, the system detected Sue left the room and asks John and Linda if it was OK to record and transcribe during the remaining 20 minutes for Sue—John and Linda say "yes". At 2:40 the system begins recording and transcribing Meeting 3. When Sue opens Sue's device (e.g., computer, laptop, handheld phone, tablet, etc.) and dials Sue's manager's call-in for the 2:45 meeting (Meeting 4), she also can view the transcription from Meeting 3 from 2:40 pm until Meeting 3 ends.

Based on the foregoing description, it will be understood that the present invention uses calendar entries to show potential overlaps in scheduled conference calls so the system can determine what call the attendee is actually on and which the attendee may be missing. The system of this invention does not use the calendar solely but verifies the overlapping call has started as to not send unnecessary request for transcripts (and permissions request as described herein) when a call may be starting late or not at all. Other attendees must be on the call and connected such that any attendee can hear any other attendee, before our system begins to transcribe or ask for permissions to do so.

One aspect of the present invention is the determination of the presence of an attendee, and switching to the call(s) where the attendee is determined to not be present. For example, in the case where the attendee leaves one group conference call and walks to another conference room to join a second call, the attendee's presence is determine by the attendee location and other attendees/map to calendar entries, and dialing information for the current room. The conventional conference management systems require that the attendee join a meeting electronically. Additionally, based on the prior art, a meeting that is scheduled back to back would not cause this system to save any info, even if one meeting ran long (i.e., ran over 10 minutes). It's unplanned and not defined via the calendar. The present invention solves this problem by determining what calls are active and have not ended or have not started. Thus, the present invention can determine if a call is running late or ended early (i.e., two overlapping calls on a schedule may not actually overlap if one ends early).

In accordance with this invention, various techniques are utilized to determine who is attending a given conference call and who is not attending. Those who are not attending may view all or part of a transcript of the conference call on a predetermined device having access to the transcript. Other attendees may grant or deny permission to access the transcript.

Additionally, the user may switch back and forth between relevant conference calls using the system described by this invention.

Figure 8:
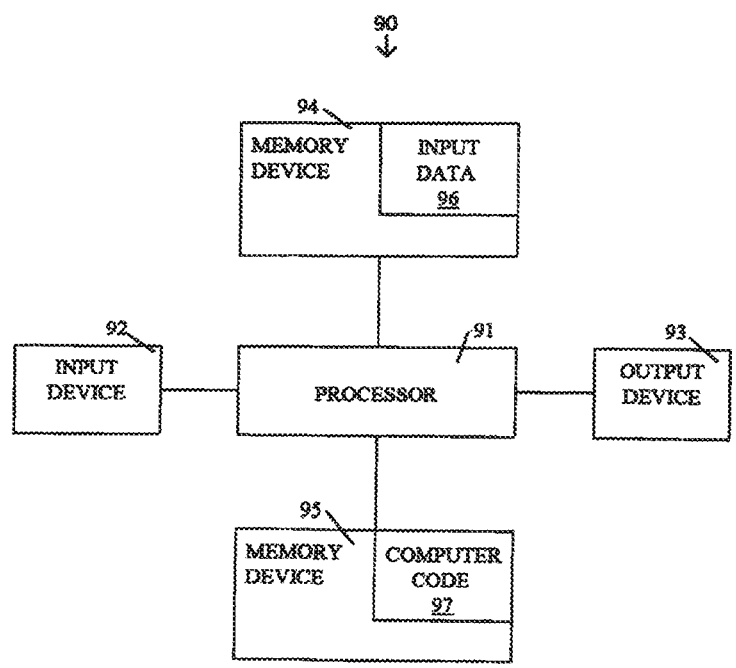
FIG. 8 illustrates a computer system used for implementing the methods of the present invention.

FIG. 8 additionally illustrates an exemplary computer system used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus, the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90. For example, the memory devices 94 and 95 may be portions of a single memory device rather than separate memory devices.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims. For example, the present invention has been described and illustrated with respect to meetings conducted via conference calls; however, the present invention may be employed when a participant cannot attend a meeting physically and desires to view a partial or full transcript of the meeting dialog. In this instance, the meeting dialog may be recorded and transcribed in the same manner as a telephone call.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method implemented by a computer for managing meetings, said method comprising:
receiving, by the computer, electronic meeting invitations to attend, by a user, a plurality of meetings;
identifying an attended meeting, the attended meeting being a meeting of the plurality of meetings at which the user is determined to be present in real time based at least on user location data;
identifying a meeting to be transcribed, said meeting to be transcribed being selected from the plurality of meetings and exclusive of the attended meeting;
transcribing, by a server in real time, at least a portion of said meeting to be transcribed into a first textual transcript, the portion of said meeting to be transcribed being a specific time period when the user is not attending the meeting to be transcribed;
providing, in real time, said first textual transcript in an electronic data format to said user;
detecting the user has left the attended meeting;
identifying the attended meeting as a further meeting to be transcribed in response to detecting the user has left;
transcribing, in real time and as a second textual transcript, the further meeting to be transcribed for at least a portion of the further meeting to be transcribed taking place after the user has left; and
providing the second textual transcript to the user in real time.

2. The method of claim 1, further comprising:
communicating, by the computer to the user, at least one detected conflict between conflicting meetings of the plurality of meetings;
receiving, by the computer, from the user in response to the communicated at least one detected conflict, an identification of a single meeting said user is participating and at least one conflicting meeting to be transcribed.

3. The method of claim 2, further comprising:
determining whether said at least one conflicting meeting to be transcribed includes a conference call;
wherein said step of transcribing includes the step of transcribing content of said conference call.

4. The method of claim 3, further comprising:
determining a call connection status for said user for the conflicting meetings.

5. The method of claim 1, further comprising:
accessing a calendar system for said user for said plurality of meetings.

6. The method of claim 5, further comprising:
determining location data for said user during said plurality of meetings.

7. The method of claim 6, further comprising:
determining said location data via a global positioning system.

8. The method of claim 6, further comprising:
comparing said location data with calendar data in said calendar system to determine if said user is participating in said plurality of meetings.

9. The method of claim 1, further comprising:
requesting permission to transmit said first textual transcript to an attendee.

10. The method of claim 9, further comprising:
blocking at least a portion of said first textual transcript where permission is not granted.

11. The method of claim 9, further comprising:
identifying a person who refused permission to transmit said first textual transcript.

12. The method of claim 9, further comprising:
caching said first textual transcript until permission to transmit is received.

13. The method of claim 9, further comprising:
rebuilding said first textual transcript in chronological order based on speakers who have granted permission to transmit said first textual transcript.

14. The method of claim 1, further comprising:
detecting the user's presence at the meeting to be transcribed; and
terminating the transcribing of the meeting to be transcribed when the user's presence at the meeting to be transcribed is detected.

15. The method of claim 1, further comprising:
switching back and forth between said first textual transcript and the second textual transcript, based on continued detection of the user's presence.

16. A computer system comprising:
a processor;
a memory coupled to said processor; and
a computer readable storage device coupled to the processor, the storage device containing instructions executable by the processor via the memory to implement a method for managing meetings, the method comprising the steps of:
receiving invitations to attend, by a user, a plurality of meetings;
identifying an attended meeting, the attended meeting being a meeting of the plurality of meetings at which the user is determined to be present in real time based at least one user location data;
identifying a meeting to be transcribed, said meeting to be transcribed being selected from the plurality of meetings and exclusive of the attended meeting;
transcribing, in real time, at least a portion of said meeting to be transcribed into a first textual transcript, the portion of said meeting to be transcribed being a specific time period when the user is not attending the meeting to be transcribed;
providing, in real time, said first textual transcript to said user;
detecting the user has left the attended meeting;
identifying the attended meeting as a further meeting to be transcribed in response to detecting the user has left;
transcribing, in real time and as a second textual transcript, the further meeting to be transcribed for at least a portion of the further meeting to be transcribed taking place after the user has left; and
providing the second textual transcript to the user in real time.

17. The system of claim 16, further comprising:
detecting the user's presence at the meeting to be transcribed; and
terminating the transcribing of the meeting to be transcribed when the user's presence at the meeting to be transcribed is detected.

18. The system of claim 16, further comprising: switching back and forth between said first textual transcript and the second textual transcript based on continued detection of the user's presence.

19. A computer program product comprising:
a computer-readable storage device; and
a computer-readable program code stored in the computer-readable storage device, the computer readable program code containing instructions executable by a processor of a computer system to implement a method for managing said method comprising:
receiving invitations to attend, by a user, a plurality of meetings;
identifying an attended meeting, the attended meeting being a meeting of the plurality of meetings at which the user is determined to be present in real time based at least on user location data;
identifying a meeting to be transcribed, said meeting being selected from the plurality of meetings and exclusive of the attended meeting;
transcribing, by a server in real time, at least a portion of said meeting to be transcribed into a first textual transcript, the portion of said meeting to be transcribed being a specific time period when the user is not attending the meeting to be transcribed;
providing, in real time, said first textual transcript to said user;
detecting the user has left the attended meeting;
identifying the attended meeting as a further meeting to be transcribed in response to detecting the user has left;
transcribing, in real time and as a second textual transcript, the further meeting to be transcribed for at least a portion of the further meeting to be transcribed taking place after the user has left; and
providing the second textual transcript to the user in real time.

20. The computer program product of claim 19, further comprising:
detecting the user's presence at the meeting to be transcribed; and
terminating the transcribing of the meeting to be transcribed when the user's presence at the meeting to be transcribed is detected.

\* \* \* \* \*